United States Patent [19]

Gorsler

[11] 4,269,200
[45] May 26, 1981

[54] FEEDING ARRANGEMENT FOR AN AXIAL FLOW ROTARY COMBINE

[75] Inventor: Karl G. Gorsler, Zweibrücken, Fed. Rep. of Germany

[73] Assignee: Deere & Company, Moline, Ill.

[21] Appl. No.: 51,591

[22] Filed: Jun. 25, 1979

[30] Foreign Application Priority Data

Jul. 8, 1978 [DE] Fed. Rep. of Germany ....... 2830162

[51] Int. Cl.$^3$ .......................... A01F 7/06; A01F 12/10
[52] U.S. Cl. .................................. 130/27 T; 56/14.6; 130/27 AB
[58] Field of Search ................. 130/27 R, 27 T, 27 H, 130/27 AB; 56/14.6

[56] References Cited

U.S. PATENT DOCUMENTS

| | | | |
|---|---|---|---|
| 3,464,419 | 9/1969 | Knapp et al. | 130/27 T |
| 3,626,472 | 12/1971 | Rowland-Hill | 130/27 T |
| 3,827,443 | 8/1974 | Drayfer | 130/27 T |
| 4,087,953 | 5/1978 | Wilson et al. | 130/27 T |
| 4,159,023 | 6/1979 | Todd et al. | 130/27 T |
| 4,177,821 | 12/1979 | Peiler et al. | 130/27 T |

*Primary Examiner*—Paul J. Hirsch

[57] ABSTRACT

In a self-propelled combine, crop material is gathered from a field and transferred by a chain and slat-type feeder house to a fore-and-aft disposed axial flow rotary separator including, from the front, infeed, threshing and separating portions respectively. The infeed portion of the rotor is in the form of a helical conveyor having an outside diameter of approximately equal to that of the threshing and separating portions of the rotor. The chain and slat conveyor of the feeder house, which is considerably wider than the outside diameter of the separator rotor, is arranged to deliver undershot fashion to he underside of the infeed rotor. An infeed or transistion housing surrounds the infeed rotor and the transfer point from the feeder house to the infeed rotor and includes a generally horizontal top wall above the infeed rotor, opposite upright side walls converging inwards from a point adjacent the discharge end of the feeder house to meet the cylindrical portion of the separator housing at about the beginning of the threshing section, and a forwardly and downwardly sloping floor approximately continuing the slope of the lower side or floor of the feeder house and meeting the cylindrical portion of the separator housing somewhat ahead of the threshing section. The walls of the transition housing cooperate with the feeder house conveyor and the infeed rotor to provide a smooth and efficient transfer of material from the feeder house conveyor through the infeed portion of the separator into the threshing section.

6 Claims, 4 Drawing Figures

FEEDING ARRANGEMENT FOR AN AXIAL FLOW ROTARY COMBINE

BACKGROUND OF THE INVENTION

The invention relates to combine harvesters of the type having axial flow rotary separators and in particular to an improved means of transferring crop material from the feeder house of a header to the threshing portion of an approximately horizontally and fore-and-aft disposed single rotor separator.

The difficulties of achieving a smooth and efficient transfer of crop material from a feeder house to the separator of such machines is well known and is evidenced by the number of patents issuing in recent years and directed to this problem. Feeding the infeed portion of the rotor undershot fashion is a potentially compact arrangement and efficient in that crop material can be transferred directly from the feeder conveyor into engagement with the conveying surfaces of the feed rotor. However, in known undershot feeding arrangements the widths of the feeder conveyor and of the separator are approximately equal and the problem of transferring material from one to the other are not complicated by disparity in width. See, for example, U.S. Pat. Nos. 3,626,472, Rowland-Hill and 4,087,953, Wilson and Hengen. In Rowland-Hill, although a relatively wide chain and slat conveyor is used in the feeder house, the separator comprises a pair of side-by-side rotors so that the separator as a whole is also relatively wide, matching the width of the feeder conveyor. In Wilson, a patent sharing a common assignee with the present invention, a single rotor separator is disclosed but through efficient use of a pair of side-by-side augers in the feeder house, adequate feeder house capacity is obtained in a width approximately equal to the diameter of the separator.

In some situations, the use of a chain and slat-type conveyor in the feeder house may be preferred, and typically, in a combination of matched capacity, the feeder house will be much wider than the diameter of a single rotor separator. A problem of convergence of material then arises and efforts to overcome this problem continue but have so far concentrated on a type of end feeding arrangement in which the feeder conveyor delivers material into the forward face of an infeed rotor, an arrangement in which there is a less natural transfer from feeder conveyor to infeed rotor and even, in some cases, a tendency for the infeed rotor to reject rather than accept material. U.S. Pat. Nos. 3,464,419, Knapp et al and 3,827,443, Drayer both disclose end feeding arrangements and both have, as is typical, a generally frustoconical transition housing surrounding the infeed rotor and receiving the discharge from the feeder conveyor through an opening in a forward bulkhead.

SUMMARY OF THE INVENTION

Accordingly, an object of the present invention is to provide in a combine harvester having a fore-and-aft oriented axial flow rotary separator a compact and efficient juxtaposition of feeder house and separator in which the feeder house is considerably wider than the diameter of the separator.

It is a particular object of the invention to provide a juxtaposition of relatively wide feeder conveyor and infeed rotor of a separator and associated transition housing realizing much of the potential for compactness and smooth and efficient transfer of crop material from feeder conveyor to separator residing in an undershot feeding arrangement as outlined above.

According to the invention, there is provided an axial flow rotary threshing and separating apparatus for combine harvesters, comprising a rotatably mounted threshing and separating rotor which extends axially through a threshing and separating housing. A front infeed portion of the rotor extends into a transition portion of the housing comprising a bottom wall which inclines upwardly to the rear from the bottom of an inclined conveyor housing through which the crop is fed up to the separator, generally upright side walls which converge to the rear from the conveyor housing, and a top wall which continues the line of the upper portion of the housing parallel to the rotor axis, whereby the crop is fed and converged to a bottom sector of the infeed portion of the rotor, the infeed rotor portion having the same diameter as the threshing and separating part of the rotor, at least where it meets the threshing portion. In this way, the crop material can be transferred substantially better than hitherto and can also be prepared and/or compressed in the infeed region of the threshing and separating apparatus so that there is no congestion of material in the transition or receiving portion of the separator housing. A good intake of crop material and effective compression are achieved by virtue of the fact that the side walls and the bottom of the receiving portion flare outwards in a funnel-like configuration in a forward direction, and the infeed portion of the rotor rotates within the receiving portion. In this arrangement, it is advantageous for the side walls to be vertical at least in their lower portions and substantially aligned at their front ends with the side walls of the inclined conveyor housing whose internal width is greater than the internal width of the threshing housing portion. Even in the case of a particularly wide inclined conveyor housing, it is possible to ensure that the crop material is efficiently transferred from the feeder house conveyor to the separator rotor and into the threshing portion by virtue of the particular configuration of the transition housing cooperating with the infeed rotor portion.

It is advantageous for the periphery of the conveyor members or flighting of the rotor infeed portion to be substantially cylindrical and to carry conveyor members which are disposed on a cylindrical surface whose of a diameter substantially equal to the diameter of the threshing portion of the rotor. An infeed rotor portion with a frusto-conical periphery may also be used but again it is preferable for the diameter at its downstream end to be approximately equal to that of the rotor threshing portion. As the outside diameter of the infeed rotor portion downstream end is equal to the diameter of the threshing portion of the rotor, there is also no congestion of material behind the infeed portion. Successful operation may be achieved with ratios of the diameter of the separator housing to the width of the inclined conveyor 1:1.5 or more.

DESCRIPTION OF THE PREFERRED EMBODIMENT

Figure 1:
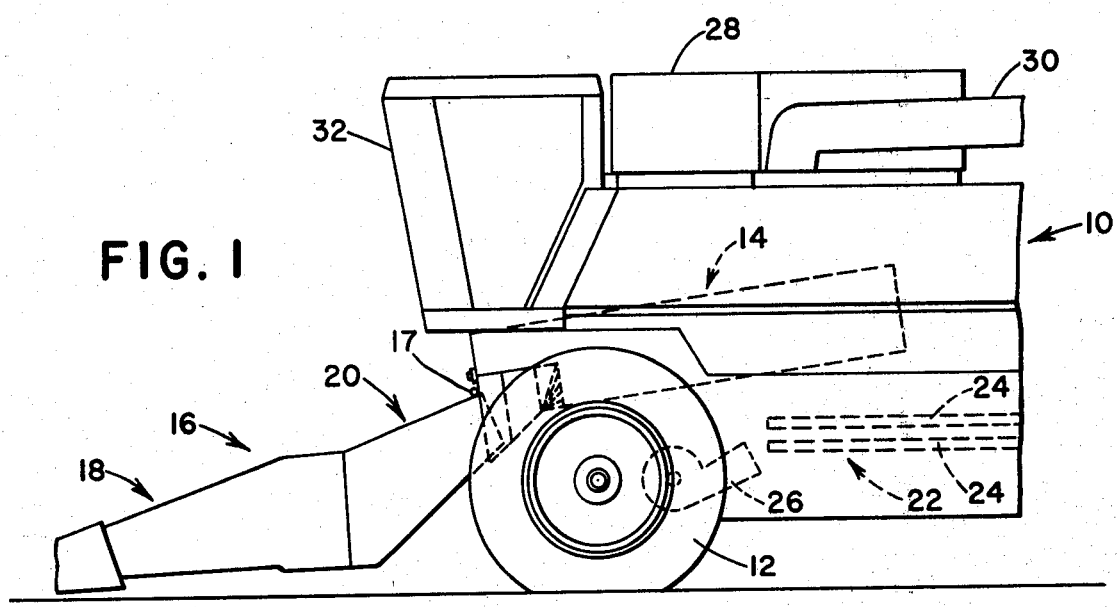
FIG. 1 is a side elevation of the forward part of a self-propelled combine enbodying the invention.
Figure 3:
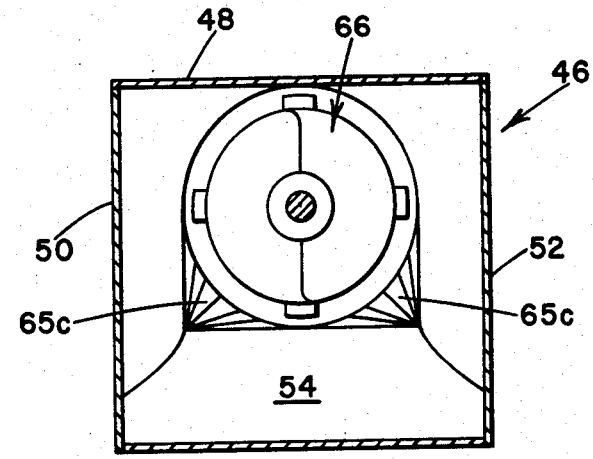
FIG. 3 is a front view approximately on line 3—3 of FIG. 2 showing the transition housing and the disposition of the infeed rotor portion within it.

The invention is embodied in a self-propelled combine harvester a forward portion of which is shown in FIG. 1. The mode of operation of such combines and their separator is well known. The combine includes a body 10 supported above the ground by a pair of forward drive wheels 12 and steerable rear wheels (not shown) and, supported within the body, a fore-and-aft and approximately horizontally disposed axial flow rotary separator 14. A conventional header 16 is pivotally supported at the forward end of the separator 14 by pivot 17 for pivoting about a transverse axis for height control of the header 16 as is conventional. The header includes conventional gathering and feeder house portions 18 and 20 respectively. A conventional cleaning shoe 22 including sieves 24 receives air from a blower 26. Clean grain is transferred into a grain tank 28 generally above the separator 14 by a clean grain elevator (not shown) and may be unloaded from the combine through an unloading conveyor 30. There is an operator's station 32 ahead of the grain tank 28 and above the forward end of the separator 14.

Figure 2:
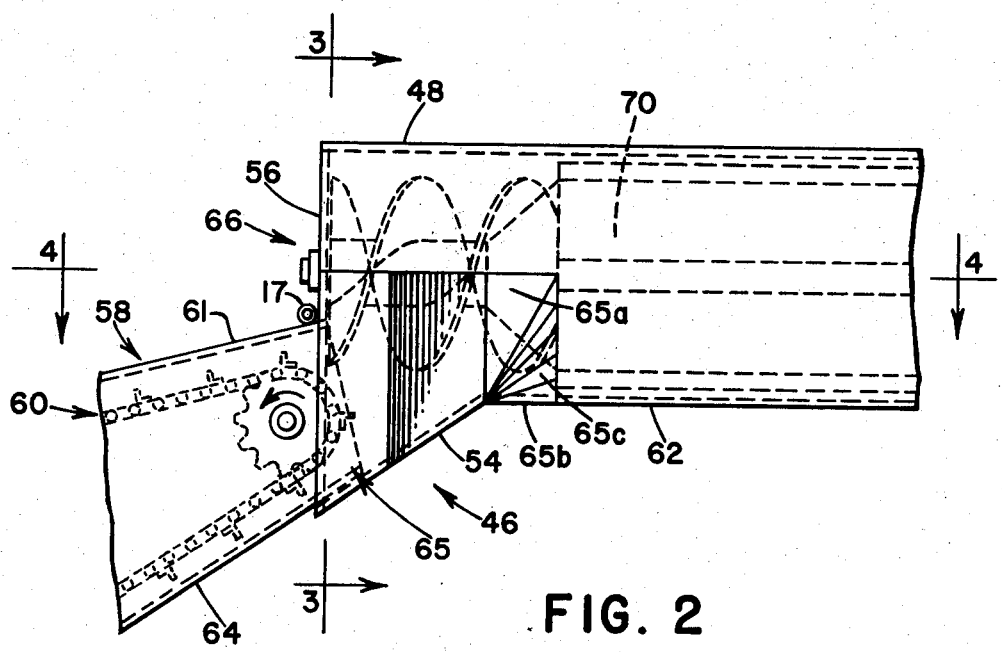
FIG. 2 is an enlarged side view showing the transition feeding arrangement for transferring crop material from a feeder house conveyor to the threshing portion of a separator.

The separator 14 includes a housing 40 which comprises a substantially cylindrical housing portion 42 in which a threshing and separating rotor 44 is rotatably mounted, and a receiving or transition portion 46 which is formed from a horizontally extending upper wall 48, opposite left and right-hand laterally spread side walls 50 and 52 respectively, a forwardly and downwardly inclined bottom 54 and an end wall 56. As can be seen in particular from FIG. 4, the side walls 50 and 52 are formed in the manner of a funnel-like member which flares out in a foward direction to the inclined conveyor housing 58 of the feeder house 20, in which a conventional chain and slat conveyor 60 operates. As shown in FIG. 2, the upper wall 61 of the housing 58 meets the forward wall 56 of the transition housing adjacent the pivot 17 and somewhat below the rotor axis. The bottom 54 of the transition housing 46 may be in the form of an inclined plane or wall as shown in FIG. 2 or may extend in an arcuate configuration arching upwards (not shown) so as to provide a smooth transition between the bottom 62 of the cylindrical housing portion 42 and a lower floor 64 of the inclined conveyor housing 58. The space between the lower run of the conveyor 60 and the feeder house floor 64 defines a conveying channel having a discharge point 65 close to but somewhat downstream or rearward of the forward wall 56 of the rotor infeed portion 66 so that delivery to the rotor is undershot fashion.

The upright side walls 50 and 52 merge into the cylindrical portion 42 of the housing 40. The connecting transition from the horizontal rear edge of the ramp 54 and the vertical rear edges of the side walls 50 and 52 to the circular cross section of the housing is accomplished by opposite upright triangular portions 65a (FIG. 2), a horizontal triangular portion 65b (FIG. 4) and opposite curving portions 65c (FIG. 2). The transition of the upper wall 48 into the cylindrical housing portion 42 is not shown but may be similarly accomplished, or the upper wall 48 itself may be partially cylindrical in form so as to conform more closely to the infeed rotor portion 66.

The rotor 44 is of generally cylindrical configuration and at its front end an infeed portion 66 has conveyor members 68 which may be in the form of screw helices as shown. The front end of the infeed rotor portion 66 is rotatably mounted in the end wall 56 of the housing 40 and may be of a conical or frustoconical configuration as an alternate to the cylindrical form shown. In the embodiment illustrated, the infeed rotor portion 66 is of a substantially cylindrical configuration and has an outside diameter which is substantially equal to the diameter of the threshing portion 70 of the rotor 44.

Figure 4:
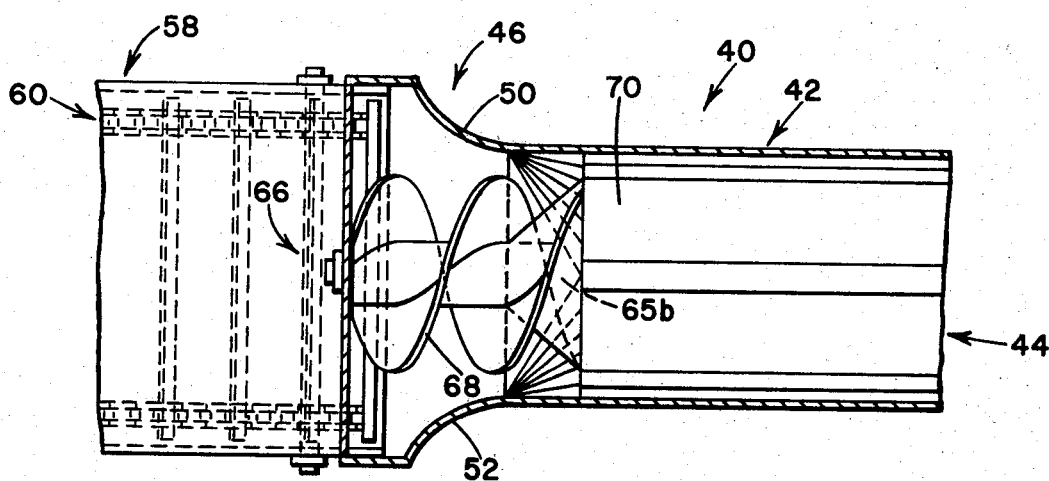
FIG. 4 is an overhead sectional view of the feeding arrangement taken approximately on line 4—4 of FIG. 2.

As can be seen in particular from FIG. 4, the internal width of the feeder conveyor housing 58 is substantially greater than the internal diameter of the separator housing cylindrical portion 42. The ratio between the diameter of the housing 42 and the width of the housing 58 may advantageously be 1:1.5 or more.

The advantageous design of the transition housing 46 and the infeed rotor portion 66 cooperate so that crop material can be readily engaged by the rotor, even when the inclined conveyor 60 is very wide, as the crop material is so prepared and/or compressed in the feed zone by means of the infeed rotor portion 66, and transferred into the narrower threshing and separating housing 42. Thus, a smooth and efficient feeding is possible in a combine harvester with a single rotor separator without blockages occurring in the feed zone. This is achieved in part by virtue of the infeed rotor portion 66 extending the length of the funnel-like transition housing 46 and the conveyor 60 delivering material rearwardly and upwardly into the functional surfaces of the infeed rotor 66. With this feeding arrangement, there is the advantage that the crop material can be fed to the infeed rotor portion 66 only from below and from the side, the crop material then being prepared and/or compacted by the intake portion 66.

I claim:

1. In a combine harvester having a generally fore-and-aft and horizontally disposed axial flow rotary separator including a threshing portion in which a rotor is rotatably mounted and surrounded by a generally cylindrical separator housing, the rotor having upstream threshing and downstream separating portions and cooperating with the housing to thresh and separate crop material received at the threshing portion of the separator while conveying the material in a spiral path downstream in an annular space between the rotor and the separator housing, the combine also including a forward mounted header including a gatherer for removing crop material from a field as the harvester advances, an improved feeding arrangement for transferring crop material from the gatherer to the threshing portion of the separator comprising:

a rotor infeed portion coaxial and rotatable with the separator rotor and including outwardly extending helically extending conveying elements disposed upstream of the rotor threshing portion and having an outside diameter approximately equal to that of the rotor threshing portion;

a feeder house included in the header and including a chain and slat conveyor having a lower conveying run moving rearwardly and upwardly and a return run above it, the feeder house being wider than the separator and including opposite upright side walls and a rearwardly and upwardly sloping floor parallel to and spaced below the conveying run of the conveyor, the space between the floor and the conveying run comprising a conveying channel having an inlet in a receiving relationship with the gatherer and an outlet disposed below and adjacent the upstream end of the infeed rotor portion; and a transition housing having a bottom wall sloping rearwardly and upwardly from adjacent the outlet of the conveying channel to meet the cylindrical separator housing adjacent the upstream end of the rotor threshing portion, a pair of opposite generally upright side walls, each wall extending from adjacent an opposite side wall of the feeder house and converging rearwardly and inwardly to meet the cylindrical separator housing adjacent the upstream end of the threshing portion of the rotor, a top wall which continues the line of the cylindrical separator housing parallel to the rotor axis and a forward transverse wall closely adjacent the forward end of the rotor infeed portion so that in operation crop material discharged from the outlet of the conveying channel is guided rearwardly and upwardly by the bottom wall and at the same time converged inwardly by the opposite side walls to be engaged by a lower portion of the rotor infeed portion and conveyed rearwardly into the threshing portion of the separator.

2. The invention defined in claim 1 wherein the side walls of the transition housing extend generally vertically and at their front ends are aligned with and closely adjacent the side walls of the feeder house.

3. The invention defined in claim 1 wherein the width of the feeder house is approximately 1.5 times the diameter of the cylindrical portion of the separator housing.

4. The invention defined in claim 1 wherein the outlet of the conveying channel of the feeder conveyor is downstream of the forward end of the rotor infeed portion.

5. The invention defined in claim 1 wherein the connection of the upright side walls of the transition housing to the cylindrical portion of the separator housing includes opposite approximately triangular upright side wall portions extending rearward from the upright side walls of the transition housing, an approximately triangular and horizontal floor portion extending rearwards from the transition housing bottom wall, and opposite generally frusto-conical transition portions extending respectively between the opposite upright triangular portions and the horizontal triangular floor portion and having rearward edges contiguous with and conforming to the cylindrical form of the cylindrical portion of the separator housing.

6. The invention defined in claim 1 wherein the feeder house is pivotally connected to the rotor transition housing and includes an upper wall meeting the forward transverse wall of the transition housing below the axis of the rotor and the feeder conveyor extends somewhat rearward of said forward wall.

* * * * *